(12) United States Patent
Zeiler et al.

(10) Patent No.: US 9,469,285 B2
(45) Date of Patent: Oct. 18, 2016

(54) BRAKE ARRANGEMENT

(71) Applicant: AGCO International GmbH, Hesston, KS (US)

(72) Inventors: Hans-Peter Zeiler, Marktoberdorf (DE); Klaus Brugger, Marktoberdorf (DE)

(73) Assignee: AGCO INternational GmbH, Neuhausen (CH)

( * ) Notice: Subject to any disclaimer, the term of this patent is extended or adjusted under 35 U.S.C. 154(b) by 98 days.

(21) Appl. No.: 14/581,288

(22) Filed: Dec. 23, 2014

(65) Prior Publication Data

US 2015/0203084 A1   Jul. 23, 2015

(30) Foreign Application Priority Data

Dec. 23, 2013   (GB) .................................. 1322919.0

(51) Int. Cl.
  *B60T 11/21*   (2006.01)
  *B60T 7/06*   (2006.01)

(52) U.S. Cl.
  CPC . *B60T 11/21* (2013.01); *B60T 7/06* (2013.01)

(58) Field of Classification Search
  CPC .................................. B60T 11/21; B60T 7/06
  See application file for complete search history.

(56) References Cited

U.S. PATENT DOCUMENTS

| | | | | |
|---|---|---|---|---|
| 4,205,734 A | | 6/1980 | Ostrowski | |
| 4,702,330 A | * | 10/1987 | Vatter | B62D 11/08 180/6.2 |
| 4,898,078 A | * | 2/1990 | Gage | E02F 9/2217 303/9.61 |
| 8,177,306 B2 | * | 5/2012 | Cadeddu | B60T 11/20 188/345 |
| 8,789,668 B2 | * | 7/2014 | Alberti | B60T 11/101 188/345 |
| 8,979,216 B2 | * | 3/2015 | Brenninger | B60T 11/21 188/345 |
| 9,090,239 B2 | * | 7/2015 | Mamei | B60T 11/21 |
| 9,122,301 B2 | * | 9/2015 | Brugger | B60T 7/04 |
| 9,216,758 B2 | * | 12/2015 | Kerler | B60T 11/21 |
| 2003/0071517 A1 | | 4/2003 | Weil | |
| 2009/0250997 A1 | * | 10/2009 | Mamei | B60T 11/21 303/117.1 |
| 2011/0018338 A1 | * | 1/2011 | Grepl | B60T 8/4809 303/113.2 |
| 2015/0344011 A1 | * | 12/2015 | Casali | B60T 7/04 303/7 |

FOREIGN PATENT DOCUMENTS

| | | | | |
|---|---|---|---|---|
| DE | 9204417 U1 | * | 6/1992 | ............. B60T 11/21 |
| GB | 1163723 A | | 9/1969 | |

OTHER PUBLICATIONS

Intellectual Property Office, Search Report dated Aug. 11, 2014 for UK Priority Patent Application No. GB1322919.0.

\* cited by examiner

*Primary Examiner* — Thomas J Williams
*Assistant Examiner* — Mariano Sy

(57) ABSTRACT

A brake arrangement for a vehicle having a cardan brake and separate left and right brakes. The left brake activated by movement of a first lever and the right brake is activated by movement of a second lever. The left brake, right brake and the cardan brake are activated together by movement of both levers together, characterized in that the cardan brake is connected to a fluid supply in a circuit which comprises a first and a second brake valve arranged in series and the first brake valve is operable by the first lever and the second brake valve is operable by the second lever.

13 Claims, 2 Drawing Sheets

BRAKE ARRANGEMENT

BACKGROUND OF THE INVENTION

1. Field of Invention

This invention relates to a brake arrangement for a vehicle, more specifically the invention relates to a brake arrangement for a tractor having a cardan brake, or front axle brakes and separate left and right rear brakes.

2. Description of Related Art

The left and right rear wheels of modern tractors are provided with separate left and right brakes which are activated by the driver by respective foot pedals wheels to assist with steering. The tractor is further provided with a cardan brake which is activated together with both left and right brakes when both foot pedals are depressed together.

DE9204417 discloses a hydraulic brake arrangement in which two foot pedals are connected to two separate rear brakes and a front axle brake. The front axle brake is connected by a switch valve to both foot pedals which in turn operate two respective hydraulic cylinders. The switch valve activates when sufficient pressure is applied, that is when both cylinders are depressed. When only one cylinder is depressed there is not usually enough pressure to enable the front brake to be activated and as a result only one of the rear brakes is activated.

However, switch valves suffer from wear and tear and may start to open under lower pressures, that is, when only one foot pedal is depressed. This can lead to safety issues as a non reliable front brake may work in addition to a rear brake when it is not meant to. For example, the driver may only wish to apply one rear brake to steer around a corner, but if the front brake is also inadvertently applied there may be consequences if travelling at speed.

OVERVIEW OF THE INVENTION

It is aim of the invention to provide an improved brake arrangement for operating separate left and right rear brakes and a cardan brake which is reliable and safe.

According to the invention there is provided a brake arrangement for a vehicle having a cardan brake or front axle brakes and separate left and right rear brakes, said left brake activated by movement of a first lever 4L, said right brake activated by movement of a second lever and said left brake, right brake and the cardan brake activated together by movement of both levers together, characterised in that the cardan brake is connected to a fluid supply 5 in a circuit comprising a first and a second brake valve arranged in series, said first brake valve operable by the first lever and said second brake valve operable by the second lever.

The invention has the advantage that when either the left or right lever is pressed, there is at least one valve between the fluid supply and the cardan brake which will not be opened by the lever and thus prevents activation of the cardan brake.

Preferably, the left brake is connected to a fluid supply and activated by a left brake valve and wherein the right brake is connected to the fluid supply and activated by a right brake valve, said left and right brake valves connected in parallel and said left brake valve and said first brake valve operable by the first lever and said right brake valve and said second brake valve operable by the second lever.

Preferably, the cardan brake is connected to a fluid supply by an associated cardan brake valve, said valve being a relay valve connected in series with the first and second brake valves.

Preferably, the left brake is connected to the fluid supply by an associated left brake valve being a relay valve and said right brake is connected to the fluid supply by an associated right brake valve being a relay valve.

When the associated brake valves are opened, the respective brakes are preferably activated by connection to the fluid supply.

Preferably, the first brake valve and second brake valve are connected to the fluid supply by a first control valve and wherein the left and right brake valves are connected to the fluid supply by a second control valve.

The first and second control valves are preferably opened by movement of one or both of the levers.

The fluid supply, preferably comprises two separate fluid supplies and the first control valve is connected to one separate fluid supply and the second control valve is connected to a second separate fluid supply.

Movement of the first and second levers together preferably opens the first brake valve, the second brake valve, the left brake valve 13 and the right brake valve.

Movement of either the first lever or the second lever preferably opens the first brake valve or the second brake valve and either the left brake valve or the right brake valve.

Movement of either the first lever, or the second lever does not permit activation of the cardan brake.

The brake arrangement may be a pneumatic or a hydraulic arrangement.

The first and second levers may be foot pedals.

Further features are claimed in the dependent claims.

BRIEF DESCRIPTION OF THE DRAWINGS

The invention will now be described, by example only, with reference to the following figures in which.

DETAILED DESCRIPTION OF EXEMPLARY EMBODIMENTS

Figure 1:
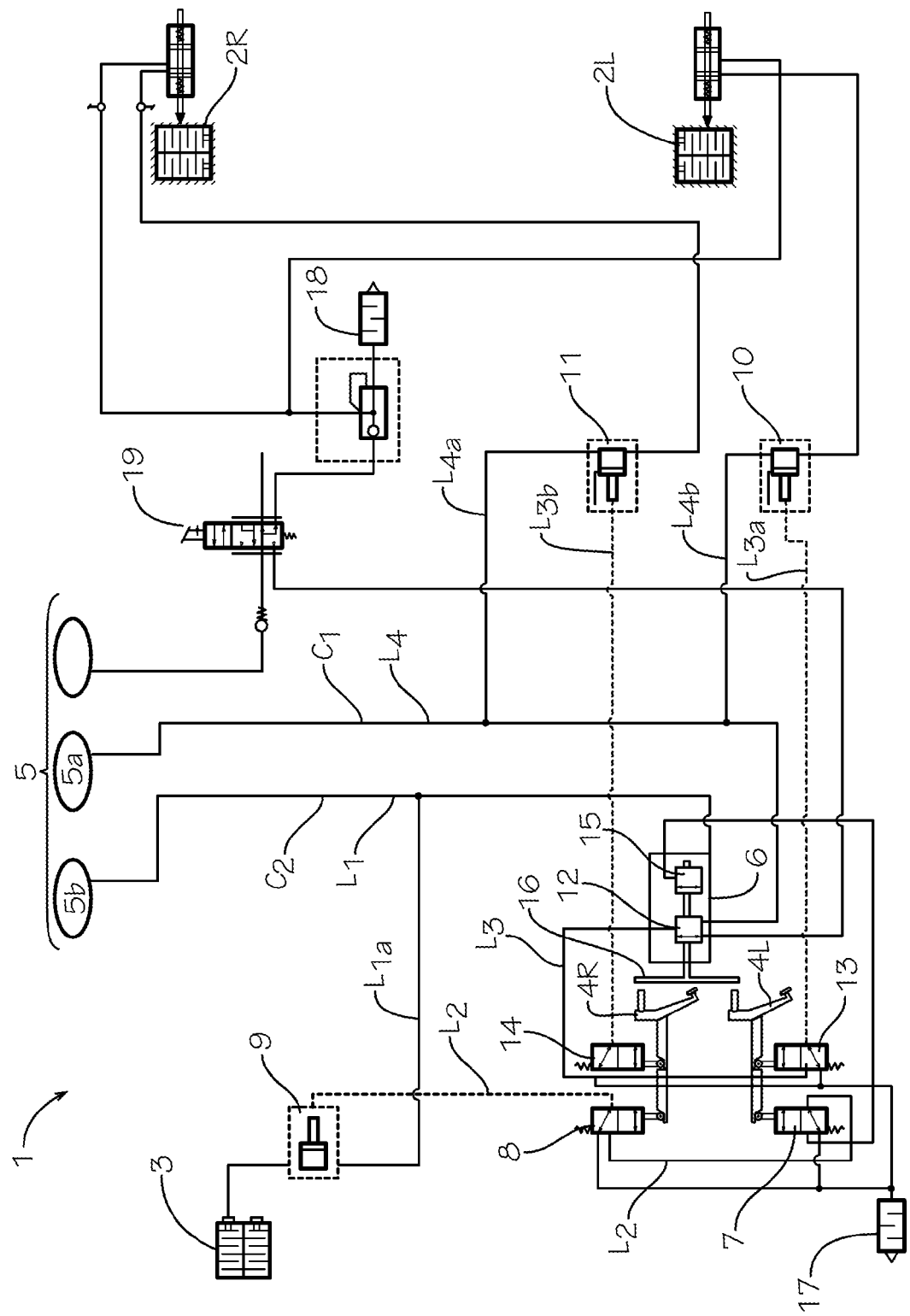
FIG. 1 is a schematic of the brake arrangement in accordance with the invention.

FIG. 1 shows a circuit diagram 1 of a pneumatically operable brake system for an agricultural tractor having a first brake circuit C1 for activating left and right rear brakes 2L, 2R individually for application to left and right rear wheels respectively (not shown). This first brake circuit comprises a first control valve 12 and supply lines L3, L3a, L3b, L4, L4a and L4b. Left and right rear brakes 2L, 2R are operable by respective left and right associated brake valves 10, 11.

The system further comprises a second brake circuit C2 for cardan brake 3 for application to an output shaft from the transmission. Cardan brake 3 is operable by cardan brake associated valve 9. This second brake circuit comprises a second control valve 15 and supply lines L1, L1a and L2. Cardan brake 3 for operating front brakes.

Cardan brake associated valve 9 and left and right associated brake valves 10 and 11 are all relay valves.

The brakes 3, 2L, 2R are activated by the driver by two levers, such as two foot pedals 4L, 4R. Left or first foot pedal 4L, when pressed opens a left brake valve 13 and a first cardan brake valve 7. Right or second foot pedal 4R when pressed opens a right brake valve 14 and a second cardan brake valve 8. Movement of both, or either of the pedals 4L, 4R will activate first and second control valves 12, 15.

Pedals 4L, 4R will activate a piston or pistons (not shown) of a cylinder or cylinders 6 which activate first and second pressure control valves 12, 15.

The brakes 3, 2L and 2R are connected to a fluid supply 5 such as a compressor, or air chamber via associated valve 9 and associated left and right brake valves 10 and 11 respectively. When neither lever 4L, nor 4R is pressed the cardan brake associated valve 9 and left and right associated brake valves 10 and 11 are in a closed position which means that the brakes 3, 2L and 2R are not activated. Each brake circuit C1, C2 is connected to a separate fluid reservoir of the fluid supply 5. The first brake circuit C1 is connected to fluid supply 5a and the second brake circuit C2 is connected to fluid supply 5b.

The first control valve 12 and the second control valve 15 are each connected to the fluid supply 5a and 5b respectively for pneumatically activating the associated brake valves 9, 10 and 11.

The second control valve 15 switches the associated cardan brake valve 9 to an open position via first and second cardan brake valves 7, 8 (when both brake valves 7, 8 are open) which then activates the cardan brake 3. First and second cardan brake valves 7, 8 are arranged in series.

The first control valve 12 switches either left associated brake valve 10 or right associated brake valve 11, or both of them to an open position via left and/or right brake valves 13, 14. When the associated brake valve 10, 11 is open, brake 2L and/or brake 2R is activated. Associated brake valves 10 and 11 are connected in parallel.

Valves 17 and 18 are de-airation valves for the arrangement. Valve 19 is used to operate a handbrake on the arrangement and may also be connected to brakes on trailer attached to the tractor. Valves 17, 18, 19 do not form part of the invention and are therefore not described in any further detail.

When neither of the pedals 4L, 4R are moved, first and second cardan brake valves 7, 8 and left and right brake valves 13, 14 are biased to a closed position. When both foot pedals 4L, 4R are pressed together, a bar 16 activates first and second control valves 12, 15 and at the same time left and right brake valves 13, 14 and first and second cardan brake valves 7, 8 are opened. Air flows from the fluid supply 5b, along line L1, through second control valve 15, along line L2 through first and second cardan brake valves 7, 8 and through to cardan brake associated valve 9 which switches valve 9 to an open position. Air can then flow from the fluid supply 5b along line L1 and L1a to the brake 3. At the same time, air also flows from the fluid supply 5a, along line L4 through first control valve 12, along line L3 through left and right brake valves 13, 14 and along lines L3a, L3b through to associated brake valves 10, 11 which switch valves 10, 11 to an open position. Air can then flow from air supply 5a through line L4, through lines L4a and L4b to activate rear brakes 2L, 2R.

If the driver simply wishes to apply one of the rear brakes, for example the left rear brake 2L to help him steer left around a bend, the driver pushes the left foot pedal 4L only. In this instance first cardan brake valve 7 and left brake valve 13 open but second cardan brake valve 8 and right brake valve 14 are not activated and therefore remain closed. Control valves 12, 15 are both opened by bar 16. Air from the fluid supply 5b passes through line L2 through first cardan brake valve 7 but cannot pass through second cardan brake valve 8 as it is closed. As a result, cardan brake associated valve 9 cannot be activated and thus line L1a cannot carry air to apply the cardan brake 3. Only the left rear brake 2L is applied since although air flows from the supply 5A, along line L4 and through control valve 15, it cannot flow through right brake valve 14 which controls the air flow to the associated right brake valve 11. As a result, right rear brake 2R is not activated and only left rear brake 2L is.

Pedals 4L and 4R may be pressed together by joining them with a connector (not shown), so that when one pedal is moved by the driver, the other connected pedal also moves.

Similarly, if only the right foot pedal 4R is pressed, first and second control valves 12, 15, second cardan brake valve 8 and right brake valve 14 open but first cardan brake valve 7 and left brake valve 13 remain closed. Air from the fluid supply 5b passes through second control valve 15 but cannot pass through first cardan brake valve 7 to activate associated cardan brake valve 9 as first cardan brake valve 7 is closed. Therefore cardan brake 3 cannot be applied. Only the right rear brake 2R is applied since left brake valve 13 which controls the air flow to the associated left brake valve 10 is closed and therefore left rear brake 2L is not activated. Air flowing from the fluid supply 5a therefore flows through first control valve 12 and through right brake valve 14 to activate associated right brake valve 11. Air can then flow through line L4 and L4a to activate brake 2R.

The first or second cardan brake valve 7, 8 remains closed when only one foot pedal is pressed and the cardan brake associated valve 9 cannot be activated and therefore the cardan brake 3 cannot be accidentally applied.

Figure 2:
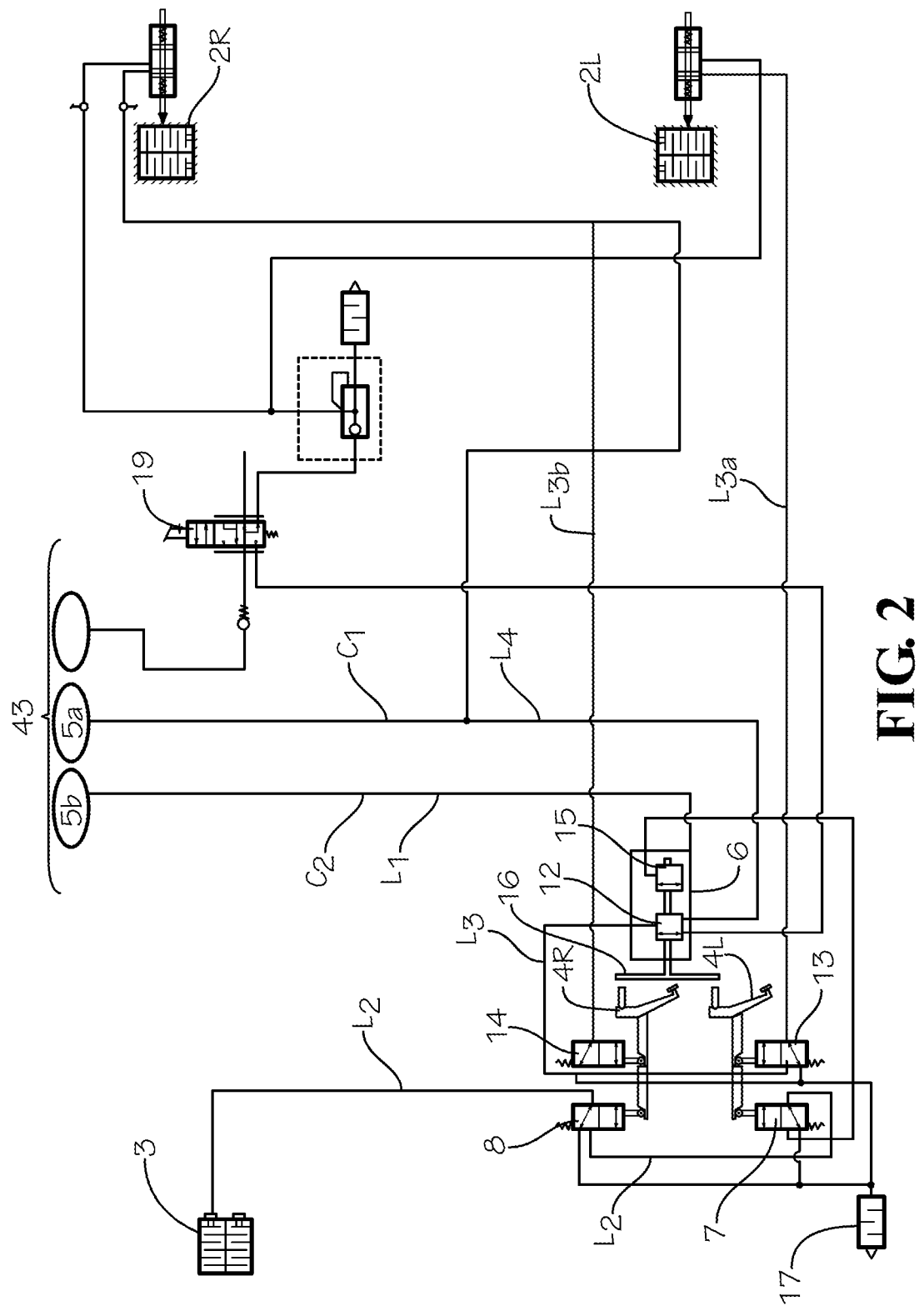
FIG. 2 is an alternative schematic of the brake arrangement in accordance with the invention.

FIG. 2 shows an alternative embodiment of the invention in which the associated brake valve 9 and associated left and right brake valves 10 and 11 are omitted. As a result, activation of the brakes 3 is achieved directly throught line L2, whereas activation of left and right brakes 2L, 2R is achieved directly through lines L3a and L3b respectively. The same features in FIG. 2 are given the same references as those in FIG. 1.

When both foot pedals 4L, 4R are pressed together, the bar 16 activates first and second control valves 12, 15 and at the same time left and right brake valves 13, 14 and first and second cardan brake valves 7, 8 are opened. Air flows from the fluid supply 5b, along line L1, through second control valve 15, along line L2 through first and second cardan brake valves 7, 8 and through to cardan brake 3 to activate it. At the same time, air also flows from the fluid supply 5a, along line L4 through first control valve 12, along line L3 through left and right brake valves 13, 14 and along lines L3a, L3b to activate rear brakes 2L, 2R respectively.

As with the arrangement in FIG. 1, if only one pedal 4L, 4R is moved, only first or second cardan brake valves 7, 8 is opened leaving the other cardan brake valve 7 or 8 closed. As a result, cardan brake 3 is not connected to the fluid supply 5b and therefore the cardan brake 3 is not activated.

Whilst the above arrangement described is intended for use as a pneumatic circuit, it is envisaged that the above described brake arrangement can also be operated hydraulically.

The invention claimed is:

1. A brake arrangement for a vehicle having a cardan brake and separate left and right brakes said left brake activated by movement of a first lever said right brake activated by movement of a second lever and said left brake, right brake and the cardan brake activated together by movement of both levers together, and wherein said cardan brake is connected to a fluid supply in a circuit, said circuit comprising a first and a second brake valve arranged in series, said first brake valve operable by the first lever and said second brake valve operable by the second lever characterised in that said left brake is connected to the fluid supply and activated by a left brake valve and said right brake is connected to the fluid supply and activated by a right brake valve and wherein said left and right brake valves are connected in parallel, said left brake valve and said first brake valve operable by the first lever and said right brake valve and said second brake valve operable by the second lever.

2. A brake arrangement as claimed in claim 1 wherein the cardan brake is connected to a fluid supply by an associated cardan brake valve, said valve being a relay valve connected in series with the first and second brake valves.

3. A brake arrangement as claimed in claim 1 wherein the left brake is connected to the fluid supply by an associated left brake valve being a relay valve and said right brake is connected to the fluid supply by an associated right brake valve being a relay valve.

4. A brake arrangement a claimed in claim 2 wherein when the associated brake valves are opened, the respective brakes are activated by connection to the fluid supply.

5. A brake arrangement as claimed in claim 1 wherein the left and right brake valves are connected to the fluid supply by a first control valve and wherein the first brake valve and second brake valve are connected to the fluid supply by a second control valve.

6. A brake arrangement as claimed in claim 5 wherein the first and second control valves are opened by movement of one or both of the levers.

7. A brake arrangement as claimed in claim 5 wherein the fluid supply comprise two separate fluid supplies and wherein the first control valve is connected to one separate fluid supply and the second control valve is connected to a second separate fluid supply.

8. A brake arrangement as claimed in claim 1 wherein movement of the first and second levers together opens the first brake valve, the second brake valve, the left brake valve and the right brake valve.

9. A brake arrangement as claimed in claim 1 wherein movement of either the left lever or the right lever opens the first brake valve or the second brake valve and the left brake valve or the right brake valve.

10. A brake arrangement as claimed in claim 9 wherein movement of either the first lever, or the second lever does not permit activation of the cardan brake.

11. A brake arrangement as claimed in claim 1 wherein the brake arrangement is a pneumatic or a hydraulic arrangement.

12. A brake arrangement as claimed in claim 1 wherein the first and second levers are foot pedals.

13. A brake arrangement as claimed in claim 1 wherein the left and right brakes are rear vehicle brakes and the cardan brake operates front vehicle brakes.

* * * * *